(12) United States Patent
Popov

(10) Patent No.: US 7,915,783 B2
(45) Date of Patent: Mar. 29, 2011

(54) BRUSHLESS ALTERNATOR WITH CLAW POLE ROTOR

(76) Inventor: Encho Nikolov Popov, Sofia (BG)

( * ) Notice: Subject to any disclaimer, the term of this patent is extended or adjusted under 35 U.S.C. 154(b) by 0 days.

(21) Appl. No.: 11/913,903

(22) PCT Filed: Jun. 6, 2007

(86) PCT No.: PCT/BG2007/000012
§ 371 (c)(1),
(2), (4) Date: Nov. 8, 2007

(87) PCT Pub. No.: WO2008/124898
PCT Pub. Date: Oct. 23, 2008

(65) Prior Publication Data
US 2010/0026131 A1    Feb. 4, 2010

(30) Foreign Application Priority Data
Apr. 16, 2007    (BG) .................................. 109856

(51) Int. Cl.
*H02K 1/24* (2006.01)
*H02K 11/04* (2006.01)
*H02K 19/26* (2006.01)

(52) U.S. Cl. ........................ 310/263; 310/68 D; 310/185
(58) Field of Classification Search .................. 310/263, 310/68 D, 185
See application file for complete search history.

(56) References Cited

U.S. PATENT DOCUMENTS

| 3,922,592 A | 11/1975 | Quantz |
| 4,611,139 A | 9/1986 | Godkin et al. |
| 5,270,604 A | 12/1993 | Sandel et al. |
| 5,705,865 A * | 1/1998 | Ishida et al. .................... 310/62 |
| 6,437,477 B1 | 8/2002 | Krefta et al. |
| 2005/0006978 A1 | 1/2005 | Bradfield |
| 2007/0013261 A1 | 1/2007 | Shichijo et al. |

FOREIGN PATENT DOCUMENTS

| DE | 1194962 B | 6/1965 |
| DE | 2545303 A1 | 4/1977 |
| DE | 2550287 A1 | 5/1977 |
| DE | 102006013196 A1 | 10/2006 |
| EP | 0634829 A2 | 1/1995 |
| EP | 1179880 A2 | 2/2002 |
| FR | 2679713 A1 | 1/1993 |
| GB | 953644 A | 3/1964 |
| GB | 1489429 A | 10/1977 |
| GB | 2135833 A | 9/1984 |
| GB | 2205693 A | 12/1988 |

(Continued)

*Primary Examiner* — Burton Mullins
(74) *Attorney, Agent, or Firm* — Brooks Kushman P.C.

(57) ABSTRACT

It is designed for accumulator batteries charging and for electrical energy generating with rectified voltage for movable and unmovable vehicles and/or objects.
It possesses two identical mirror-image disposed rotor 2 and 2a and excitation 3 and 3a sets and common stator 4 with three-phase stator winding 11 realized in two groups windings, dephasing on 60/q electrical degrees. Each winding 11 is switched on with own terminals and diodes to rectified block 26, build of group isolated 30 and group connected with chassis ground 31 diodes upset in two metal, ribbed, concentric situated inner 32 and outside 33 radiators pressed with their plane surfaces to rear end bell 7 of housing 5. Inner radiator 33 has ventilation holes 35.
Advantage of alternator is increased output current at reduced input power and constant alternator volume and speed of rotation as well as increased applied time of alternator and its bearings.

25 Claims, 6 Drawing Sheets

FOREIGN PATENT DOCUMENTS

| | | |
|---|---|---|
| JP | 57016559 A | 1/1982 |
| JP | 57040352 A | 3/1982 |
| RU | 2224348 C2 | 5/2000 |
| RU | 2170487 C1 | 7/2001 |
| WO | 84/01478 A1 | 4/1984 |
| WO | 03/039936 A2 | 5/2003 |

\* cited by examiner

BRUSHLESS ALTERNATOR WITH CLAW POLE ROTOR

FIELD OF THE INVENTION

The present invention relates to alternators and particularly to brushless alternators with claw pole rotor. Typically, brushless alternators are found in automobiles, driven by the automobile engine for purpose of re-charging the automobile battery. However, the brushless alternators of the present invention may also find use for generating of electrical energy with rectified voltage for movable and unmovable vehicles and/or objects. The present invention provides high energy output per unit volume, so as to be compact in size.

DESCRIPTION OF PRIOR ART

A brushless alternator with claw pole rotor is known [1] including drive shaft where rotor set with claw poles is immovably fit on, encompassing cylindrical excitation set coaxial of drive shaft. The rotor set is encompassed by cylindrical stator fixed to cylindrical housing covering it, the housing closed by front and rear end bells with vent-holes. The drive shaft is sustained by bearings in each end bell. To the drive shaft before the front end bell and outside of the housing cooling fan is assembled. The stator consists of cylindrical stator pack with multiple axial slots formed on its inner surface where a three-phase stator winding is situated. The excitation set comprises cylindrical magnetic core on its rear end provided with magnetic disk in the form of truncated cone which height is multifold smaller than the diameter of the great base perpendicular to the drive shaft axis of rotation. On the outside surface of excitation set cylindrical magnetic core a sector with smaller diameter is formed where a coil is situated with supplying leads brought out through slot passing over the excitation set core and the housing. The excitation set is so immovably connected to the front end bell that between its cylindrical magnetic core and stator pack a cylindrical space is formed where rotor set claw poles are placed with possibility for free rotation together with drive shaft. The rotor set with claw poles is build by supporting and supported elements joined together by nonmagnetic ring.

The supporting element consists of supporting disk with a central hole and a step-like axial sector formed around it, realizing permanent joint of the supporting element to the drive shaft. On the supporting disk periphery claw poles with great value of the ratio maximal to minimal width are located. The excitation set magnetic core is pressed to front bearing and performs role of inner bearing cap. Near to the front bearing in cylindrical magnetic core surface of the excitation set from the side of drive shaft grease reservoir is formed. A rear end bell is bitten by rear cover.

The known alternator has limited output current due to increased demagnetizing reaction of stator winding, its insufficient cooling because of complicated design where air conducted ducts are not foreseen and shorten application time. Moreover the kwon alternator has not terminal conductors for greater current between three-phase windings and rectified block and location of the rectified block securing removal of increased heat quantity at increased output current is not foreseen. Also stator winding connection to the rectified block for conducting of greater current is not foreseen. The stator winding output current is reduced because of increased demagnetizing reaction upon magnetic flux created by field coil due to concentrated execution of stator winding. Between the opposite face surfaces of rotor supporting element and field coil magnetic core magnetic attraction force is created loading additionally axially corresponding bearing connected to end bell and rotor. The efficiency is reduced because of increased value of iron losses in stator pack due to presence of significant magnetic flux axial component, which is due to increased value of claw pole ratio maximal to minimal width.

The aim of the invention is devising of a brushless alternator with claw poles with increased output current at reduced input power and constant alternator volume and drive shaft speed of rotation. Other aim of the present invention is securing of prolonged application time of alternator and its bearings.

SUMMARY OF THE INVENTION

In its broadest principles, the present invention provides a brushless alternator with claw poles which comprises a rotatable drive shaft where rotor set with claw poles is stationary fitted, enveloping cylindrical excitation set coaxial with the drive shaft. The rotor set is encompassed by cylindrical stator stationary jointed to cylindrical housing enveloping it and closed by front and rear end belles with vent-holes. In each of end bells the drive shaft is sustained on bearings. On the drive shaft and before front end bell outside the housing cooling fan is assembled. The stator consists of cylindrical stator pack with formed on its inner surface plurality of slots where three-phase stator winding is arranged. The excitation set includes cylindrical magnetic core in its rear end provided with magnetic disk shaped as truncated cone with its height multiple less than diameter of its large base perpendicular to the drive shaft axis of rotation. On the cylindrical magnetic core outside surface a sector with smaller diameter is formed where field coil is situated which supplying leads are taken out through a slot passing across excitation set magnetic core and stator. The excitation set is stationary jointed to the front end bell so that between its magnetic core and the stator pack cylindrical space is formed where rotor set claw poles are situated with possibility for free rotation together with the drive shaft. The rotor set with claw poles is build of supporting and supported elements jointed between themselves by nonmagnetic ring. The supporting element consists of supporting disk with central hole with step-like axial sector around it realizing immovable joint of the supporting element to the drive shaft. On the supporting disk periphery claw poles are uniformly arranged. To the rear end bell a cover is bitten.

According to the invention towards the rotor and excitation sets mirror-image identical second rotor and second excitation sets are disposed. The supporting elements of both rotor sets are jointed stationary to the drive shaft. The claw poles tips of both rotor sets supported elements are jointed between themselves by additional nonmagnetic ring to which also the claw poles of both rotor sets supporting elements are jointed.

For increasing the output current and improving of its distribution uniformity among diodes the stator winding consists of more than one three-phase windings and at number of slots per pole and phase q>1, the number of the three-phase windings b is defined by equation $$b = e + f$$

where e represents number of first group three-phase windings and f—number of second group three-phase windings. The second group three-phase windings are displaced on 60/q electrical degrees toward the three-phase windings of the first group. Each three-phase winding is connected to the rectified block with its own terminals and own diodes. On the stator pack outside surface second plurality of axial slots is formed which total number is less than the number z of the plurality of axial slots on its inner surface. Projections between slots of second plurality are situated over the slots of first plurality.

The rectified block is located on the outside wall of rear end bell. For efficiency increasing by reducing of iron losses in stator pack the axial component of magnetic flux in stator pack is reduced by decreasing the ratio of maximal width $t_{max}$ to minimal width $t_{min}$ of claw poles and the ratio has to meet the condition $1,8 < t_{max}/t_{min} < 2$.

Vent-holes in front end bell are performed as girdle. For achieving better diodes cooling vent-holes on rear end bell face surface are formed as inner girdle and concentric to it—outside girdle. Inner radiator pervades the inner girdle of ventilation holes.

The outside diameter j of the sector of cylindrical magnetic core outside surface with decreased diameter of each excitation set is over 50% greater than its inner diameter r of the said excitation set.

In the first configuration of the present invention number b of windings is an even number and the number in each of both groups is equal i.e. e=f. Every three-phase winding of both groups is arranged in all slots z.

In the second configuration of the invention the number b of the three-phase windings is an odd number and the number e of one group three-phase windings is greater with one than the number f of the other group three-phase windings. The half of windings of the group with greater number is arranged in the slots over three-phase windings of the group with less number and the other half three-phase windings from the group with greater number is arranged under three-phase windings of the group with less number.

In the third configuration of the invention at least part of the three-phase windings are arranged in z/q stator slots. Those z/q slots are so selected that they have an even distribution on the inner stator surface. At number b of three-phase windings divisible to the number of slots per pole and phase q all three-phase windings are arranged in z/q slots. When the number of three-phase windings is not divisible to q, part nq three-phase windings where n is an integer, are arranged in z/q slots and the left part of three-phase windings with number less than the slots per pole and phase q is arranged in all z slots.

The rectified block consists of group own to three-phase windings isolated diodes and a group own to three-phase windings diodes connected to chassis ground upset accordingly in inner and outside ring-shaped ribbed metal radiators located concentric between themselves. Each radiator possesses plane contact surface pressed to the rear wall of rear end bell. The inner radiator has cup-shaped bottom with plurality of vent-holes. Between the plane contact surface of inner radiator and the rear wall of rear end bell an electric sheet of isolation is located.

Through the outside girdle of vent-holes in the rear end bell the field coils supplying leads pass across as well as the own leads of three-phase windings.

For reducing the magnetic resistances of stator pack projections between the slots of second plurality axial slots have width s greater than width w of first plurality axial slots. Immobile joint between housing and stator is realized by projections made between every two adjacent outside axial slots on which cylindrical housing is staved having on both peripheries corresponding inner centering shoulder for front and rear end bells.

For creating possibility to supply additional consumers of alternating current for example, speedometer, autonomous rectifier for supplying of excitation sets field coils and others; the three-phase windings situated nearest to the slots opening are supplied with appropriate terminals.

For prolonging of alternator bearings applied time the outside diameter j of the sector of cylindrical magnetic core outside surface with decreased diameter of each excitation set is over 50% greater than its inner diameter r.

The wire section of the situated one over other windings in each stator slot rises in direction of slot opening.

Advantage of the brushless alternator with claw poles in keeping with the present invention is the increased output current at increased efficiency and constant alternator volume and drive shaft speed of rotation due to complex of interconnected decisions including: reduced ratio of maximal to minimal width of claw poles; wire section increasing of the situated one over the other windings in each stator slot in direction of slots openings; improved alternator's cooling; presence of second mirror-image rotor and excitation sets; second plurality axial slots of stator pack; more than one three-phase windings divided in two groups displaced one to an other on 60/q electric degrees where each three-phase stator winding is connected by own leads to own diodes with integrated positive and negative poles in sort of concentric radiators cooled simultaneously by heat transfer to the rear end bell and by convection. Additional advantage of the alternator according to the invention is prolonged alternator application time thanks to reduced temperature rise as a result of the increased efficiency, improved cooling and bearing prolonged application time, reduced rotor weight and the mutual neutralization of the action of axial magnetic forces raised between the face surfaces of supporting elements and exciter magnetic cores. Other advantage is the reduced amplitude of output rectified voltage ripples due to phase displacement between the groups of three-phase windings e and f.

BRIEF DESCRIPTION OF THE DRAWINGS

It is expressly understood, however, that he drawings are for the purpose of illustration and description only and are not intended as a definition of the limits of the invention. Embodiments of this invention will now be described by way of example in association with the accompanying drawings in which.

DETAILED DESCRIPTION OF THE PREFERRED EMBODIMENTS

The novel features which are believed to be characteristic of the present invention, as to its structures, organization, use and method of operation, together with further objectives and advantages thereof, will be better understood from the following discussion.

Figure 1:
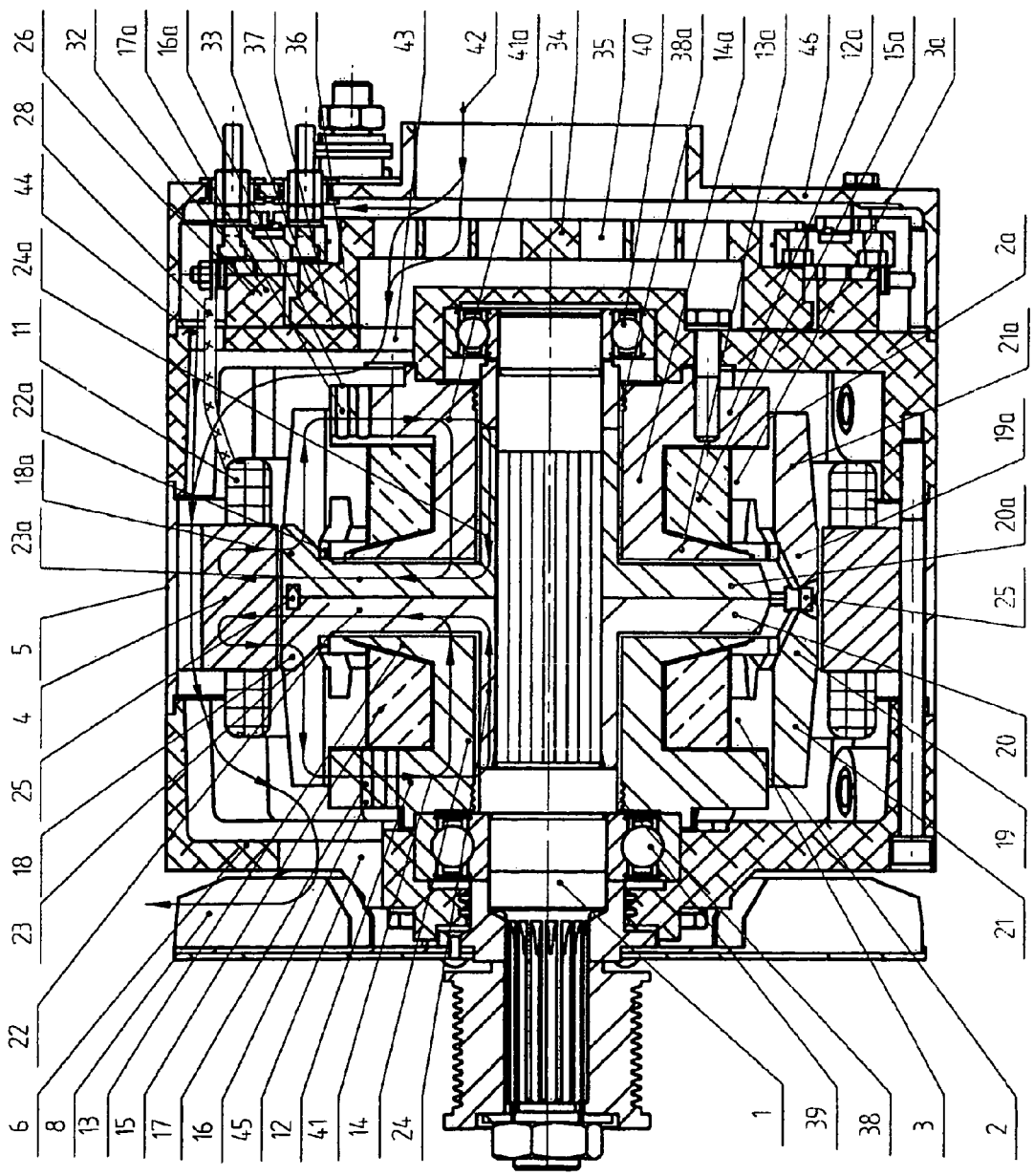
FIG. 1 represents longitudinal section of the novel brushless alternator, embodying the invention.
Figure 2:
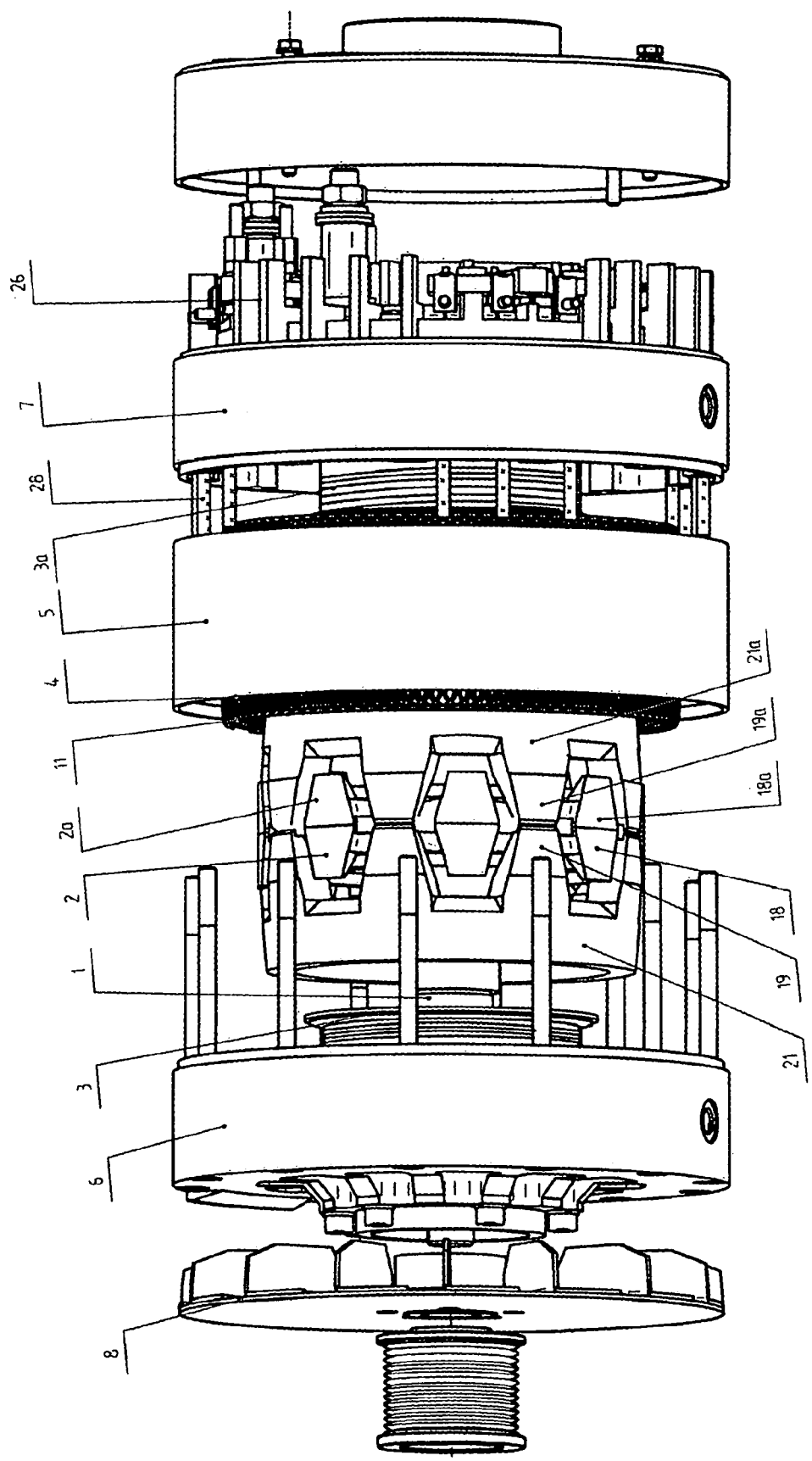
FIG. 2 represents alternator view according to the invention in process of assembling.
Figure 3:
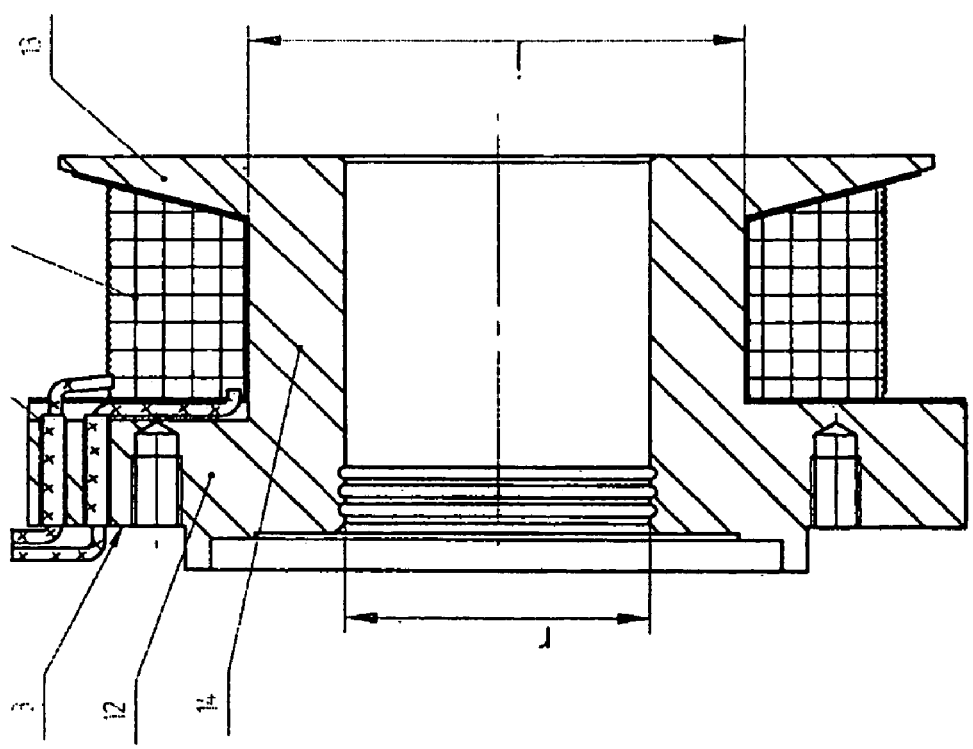
FIG. 3 represents cross-section of excitation set 3 equal to excitation set 3a mirror-image located to it.
Figure 4:
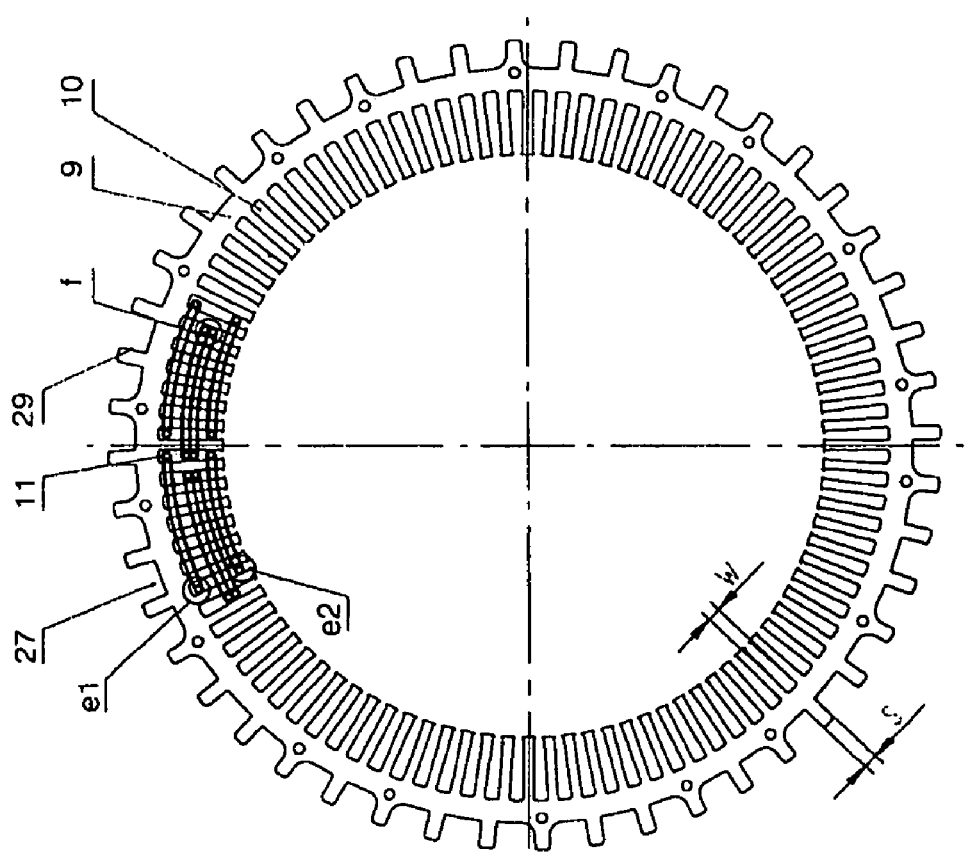
FIG. 4 represents stator cross-section where mutual situation of sections of both groups' three-phase windings $e_1$ and $e_2$ with phase displacement toward three-phase windings f is shown.

In an example embodiment of the invention the brushless alternator with claw pole rotor (FIG. 1 and FIG. 2) comprises drive shaft 1 where cylindrical rotor set 2 with claw poles is stationary fit, encompassing cylindrical excitation set 3 coaxial to drive shaft 1. The rotor set 2 is encompassed by cylindrical stator 4 stationary jointed to enveloping it cylindrical housing 5 closed by front 6 and rear 7 end bells. Drive shaft 1 is rotatably supported on bearings in each of end bells 6 and 7. On drive shaft 1 before front end bell 6 and out of housing 5 cooling fan 8 is assembled. Stator 4 (FIG.4) consists of cylindrical stator pack 9 with uniformly formed on its inner surface plurality of axial slots 10 where stator windings 11 are arranged. The excitation set 3 (FIG.1 and 3) includes cylindrical magnetic core 12 in its rear end provided with magnetic disk 13 shaped as a truncated cone with its height multiple less than the diameter of its large base. The base of magnetic disk 13 is perpendicular to the axis of rotation of drive shaft 1. On the outside surface of cylindrical magnetic core 12, a sector 14 with a smaller diameter is formed where field coil 15 is situated which supplying leads 16 are taken out through slot 17 passing across excitation set magnetic core 12 and slots 27 on outside surface of stator pack 9. Excitation set 3 is to front end bell 6 so affixed that between its magnetic core 12 and stator pack 9 a cylindrical space is formed where claw poles 18 and 19 of rotor set 2 are placed with possibility for their free rotation together with drive shaft 1. Rotor set 2 comprises supporting element 20 with claw poles 18 and supported element 21 with claw poles19 jointed stationary between themselves by nonmagnetic ring 22. Supporting element 20 consists of supporting disk 23 with a central hole and around it step-like axial sector 24 is formed realizing permanent joint of supporting element 20 to drive shaft 1. On the periphery of supporting disk 23 claw poles 18 are situated regularly.

A mirror-image of rotor 2 and excitation 3 sets corresponding second identical rotor set 2a and corresponding second identical excitation set 3a are located. Supporting elements 20 and 20a of both rotor sets 2 and 2a are stationary jointed to drive shaft 1. The tips of claw poles 19 and 19a of supported elements 21 and 21a of both rotor sets 2 and 2a are fixed between them by additional nonmagnetic ring 25 to which also the claw poles 18 and 18a of both rotor sets 2 and 2a are jointed. The ratio of maximal width $t_{max}$ minimal width $t_{min}$ meet the condition $1,8<t_{max}/t_{min}<2$.

A stator three-phase winding (FIG.4) consists of more than one three-phase winding 11. At slots per pole and phase q>1, the number of three-phase windings b is defined by equation $b=e+f$ where e represents the number of first group three-phase windings 11 and f represents the number of second group three-phase windings 11. Windings of the second group of three-phase windings 11 are transposed on 60/q electrical degrees toward three-phase windings 11 of the first group of three-phase windings.

In a first example configuration of the invention, the brushless alternator with claw pole rotor has a number b of windings 11 which is an even number, the windings number in each of both groups of three-phase windings is equal i.e. e=f and each three-phase winding from both groups is situated in all slots z.

In a second example configuration of the invention, the brushless alternator with claw pole rotor has a number b of three-phase windings 11 which is an odd number, the windings number e of one group of three-phase windings is greater with 1 than the number f of the other group of three-phase windings. The half of windings of the group with greater number is arranged in the slots 10 over three-phase windings of the group with less number and the other half three-phase windings of the group with greater number is arranged under three-phase windings of the group with less number.

In a third example configuration of the invention, the brushless alternator with claw pole rotor has at least part of three-phase windings 11 arranged in z/q stator slots. The z/q slots are so selected that they shall be evenly distributed in the stator. At number b of three-phase windings 11 divisible to q, all three-phase windings 11 are arranged in z/q slots. When the number of three-phase windings is not divisible to q, a part nq three-phase windings where n is an integer, are arranged in z/q slots and the left part of the three-phase windings with a number less than q is arranged in all z slots.

The wire section of the situated one over other windings in each stator slot rises in the direction of the slot opening.

For supplying of additional consumers of alternating current for example, speedometer, autonomous rectifier for supplying of field coils, it is advisable that additional terminals be taken out. The additional terminals are secured by three-phase windings situated nearest to the openings of slots 10.

Figure 5:
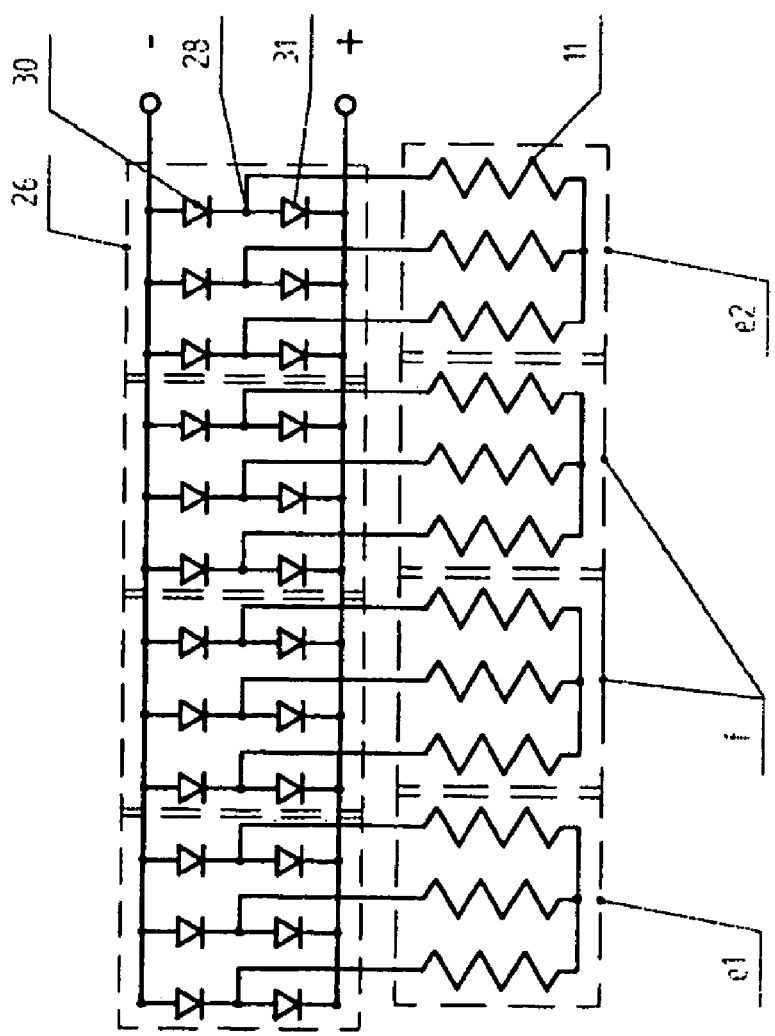
FIG. 5 represents connection diagram of 4 three-phase stator windings each with its own terminals and diodes, poles "+" and "−" of corresponding diodes in rectifier in first and second example configuration of the invention are parallel connected.

Each three-phase winding 11 (FIG. 5) is connected by terminals and diodes to rectified block 26. On the outside surface of said stator pack 9 (FIG. 4), a second plurality of axial slots 27 is formed which total number is less than the number z of the plurality of axial slots 10 on its inner surface. Projections 29 between slots 27 of the second plurality are situated over the slots 10. The width s of the projections 29 is bigger then width w of slots 10.

The permanent joint between housing 5 and stator 4 is realized by projections 29 made between every two adjacent outside axial slots 27 on which housing 5 is staved having corresponding inner centering shoulder for front 6 and rear 7 end bells.

Figure 6:
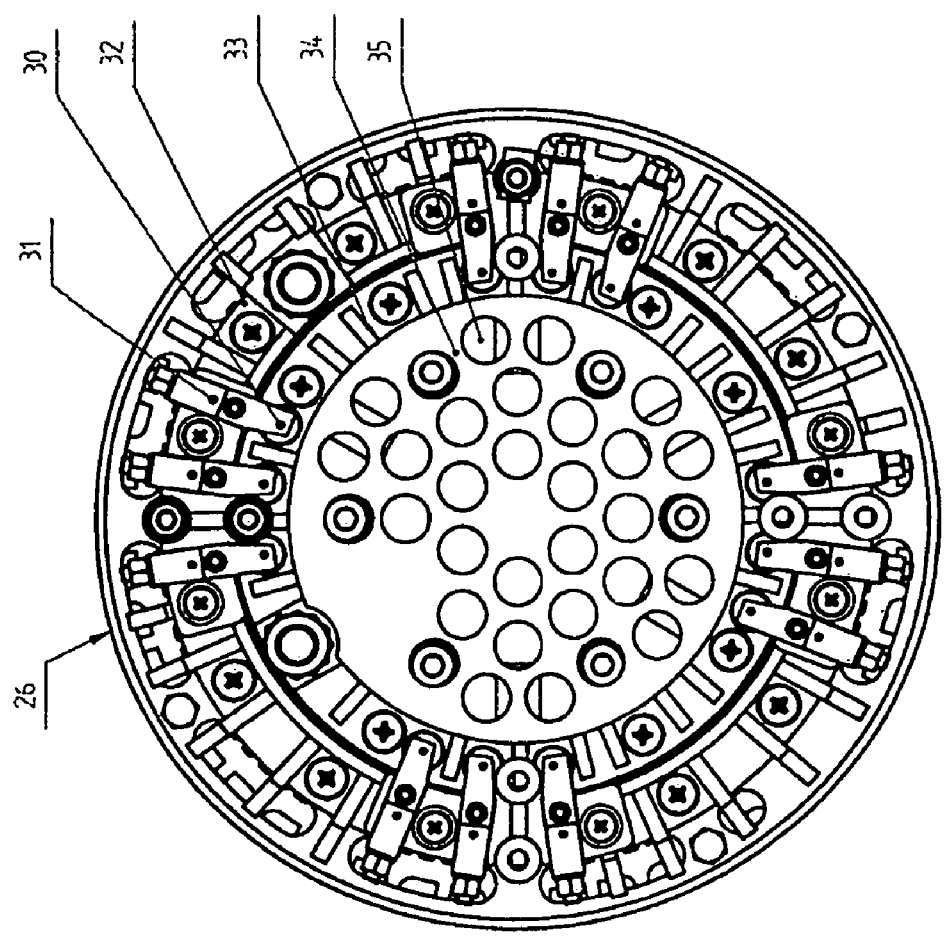
FIG. 6 represents axial face view of the rectifier situated on end bell outside surface.

On the outside wall of rear end bell 7 (FIG.1 and 6), rectified block 26 is located. Each three-phase winding 11 (FIG. 5) is connected to rectified block 26 by leads to isolated diodes 30 and connected to chassis ground diodes 31. The group of isolated diodes 30 and the group of connected to chassis ground diodes 31 of three-phase windings 11 are upset in two concentrically located ring-shaped ribbed metal outside 32 and inner 33 (FIG.1) radiators. Each radiator has a plane contact surface by which is pressed to the rear wall of rear end bell 7. Diodes 30 with isolated pole are upset in inner radiator 33 and diodes 31 with pole connected to chassis ground are upset in outside radiator 32. The inner radiator 33 has cup-shaped bottom 34 with a plurality of vent-holes 35. Between the plane contact surface 36 of inner radiator 33 and the rear wall of rear end bell 7, a thin sheet of electric isolation 37 is placed.

The outside diameter j of each sector 14 and 15 (FIG.3) with decreased diameter of outside surface of cylindrical magnetic core 12 and 12a of each excitation set 3 and 3a is over 50% greater than the diameter r of its inner cylindrical surface of every excitation set 3, 3a.

It is possible for magnetic disks 13 and 13a of magnetic cores 12 and 12a of excitation sets 3 and 3a to be formed also like separate disks with a central hole with diameter j and to be jointed stationary to the ends of magnetic cores 12 and 12a from the sides of supporting elements 20 and 20a.

It is recommendable that on the inner cylindrical surface of magnetic cores 12 and 12a of each excitation set 3 and 3r front 6 and rear 7 end bells, hydraulic seals 38 and 38a to be formed, realized as a plurality of slots filled with grease.

Magnetic cores 12 and 12a of each excitation set 3 and 3a close corresponding front 39 and rear 40 bearings, located in respective front 6 and rear 7 end bells. Front bearing 39 is axially pressed to front end bell 6.

On the face surface of rear end bell 7, inner girdles 43 and outside girdle 44 of vent-holes are formed. Inner girdle 43 of the vent-holes is enveloped by inner radiator 33. Through outside girdle 44 of vent-holes pass across supplying leads 16, 16a of field coils 15, 15a as well as leads 28 of three-phase windings 11.

On the face surface of front end bell 6, girdle 45 of vent-holes is formed.

Rear end bell 7 is attached with rear cover 46 with a central hole.

Working of Alternator with Claw Poles

After the alternator is rotated and to field coils 15 and 15a of excitation set 3 and 3a current is delivered, parallel magnetic fluxes 41 and 41a are created, each of them interacts with half of stator 4, which is over respective excitation set 3, 3a generating corresponding magnetic flux 41, 41a and passing through claw poles 18, 18a, stator 4 and back in claw poles 19, 19a, those magnetic fluxes 41, 41a act as a common double alternation flux. In this way, the magnetic path of magnetic fluxes 41, 41a through claw poles 18, 18a, 19, 19a of rotor sets 2 and 2a is shorten and the value of magnetic field flux density in the air gap between claw poles 18, 18a, 19, 19a of rotor sets 2 and 2a and inner surface of stator 4 is increased. As result of this, the electromotive force induced in stator windings 11 is also increased. Through diode block 26 stator windings 11 are connected in parallel and their voltage is rectified. The output current practically is distributed uniformly between three-phase windings 11 of stator 4. The influence of some difference between the currents of windings 11 laying above and below in stator slots 10 due to different values of slot leakage is compensated to a certain extent by the difference in wire sections of these windings 11. In consequence of phase transposition with 60/q electrical degrees between the groups three-phase windings e and f, the maximal values of demagnetizing components created by the magnetic fields do not act simultaneously as result of this, the output current is increased additionally. For averting the increase of alternator temperature rise owing to the increased output current in spite of reduced cooling air flow through rotor sets 2, 2a due to specific rotor sets design in brushless alternators, the quantity of cooling air flow is increased because the air comes in through rear cover 45, passes over near ribbed diode radiators 32 and 33 and through vent-holes 35 on bottom 34 of inner radiator 33—crosses through both concentric inner 43 and outside 44 girdles of vent-holes in face part of rear end bell 7, through slots 27 of stator pack 9 and girdle 46 of vent-holes in front end bell 6 and centrifugal is thrown away of the alternator by the fan 8. Additional increasing of electric losses in stator windings due to output current increase is compensated by reducing iron losses in stator pack 9 due to the ratio reducing of maximal and minimal widths of claw poles $t_{max}/t_{min}$ under 2 which becomes possible in the presence of two parallel fluxes 41, 41a created by excitation sets 3 and 3a and passing over both rotor sets 2 and 2a.

In spite of increased output current, the temperature rise of diodes 30 and 31 is not increased which is due except to increased quantity of cooling air also to equal output current distribution between diodes 30, 31 because of the connection of each three-phase winding 11 by its own leads to its own diodes 30, 31 integrated in common poles by concentric ribbed radiators 32, 33 pressed through their flat surfaces to the flat surface of rear end bell 7 where radiator 33 of isolated pole has bottom 34 with ventilation holes 35 whereat part of the cooling air flow is passing through.

The operation of bearings 39, 40 is unburden because a small part of magnetic core 12, 12a is in rotor 2, 2a and in encircling grooves between magnetic cores of exciters 3, 3a and shaft 1 hydraulic seals 38 are formed. Operation of bearings 39, 40 is unburden additionally by mutual neutralization of axial acting magnetic forces created between magnetic disks 13 and 13a of excitation sets 3 and 3a and supporting elements 20 and 20a of rotor sets 2 and 2a.

The alternator design according to the present invention is lighter as cylindrical magnetic cores 12 and 12a of both excitation sets 3 and 3a perform the role of a bearing cap of bearings 39 and 40.

Experimental Results Received During Investigation of Prove Sample Realizing the Present Invention:

The present inventor has made samples of the alternator with claw poles according to the invention and has received the following experimental results: output current over 400 A at 5000 $min^{-1}$, 24 V and speed range of current output from 1200 $min^{-1}$ to 5000 $min^{-1}$. Compared to other known alternators with claw poles with similar dimensions and at equal other conditions, the output current of the alternator according to the present invention is increased by 50%. At the same time efficiency is increased with over 10% leading to less fuel consumption for electric energy generating. In some limits, the alternator according to the invention can take raised electrical power drain in the vehicles besides without enhancing fuel consumption for its generating. Also it is able to replace using of two alternators in some vehicles, for example in buses securing efficiency increasing with more than 15% at respective reducing of fuel consumption. The alternator in keeping with the present invention is intended also for electrical energy generating with rectified voltage as an autonomous source for accumulator batteries charging with reducing the drive motor speed of rotation in depending on the degree of accumulator batteries charging.

REFERENCE

EP 0 120 067

The invention claimed is:

1. A brushless alternator with a claw pole rotor comprising a drive shaft with a rotor set with claw poles fitted thereon, an enveloping cylindrical excitation set disposed coaxial to said drive shaft, said rotor set enveloped by a cylindrical stator jointed to a cylindrical housing enveloping it, closed by front and rear end bells with vent-holes, in each of said end bells said drive shaft is supported by bearings, on said drive shaft before said front end bell and outside of the housing a cooling fan is mounted, a stator consists of a cylindrical stator pack with a plurality of slots formed equally on its inner surface where a three-phase stator winding is arranged, said excitation set includes a cylindrical magnetic core and on its rear end provided with a magnetizable disk shaped as a truncated cone with its height multiple less than the diameter of its large base, perpendicular to a drive shaft axis of rotation, whereat on a cylindrical magnetic core outside surface, a sector with a smaller diameter is formed where a field coil is situated which electrical leads for supplying a source of direct current electricity are taken out through a slot passing through said excitation set magnetic core and stator, said excitation set is jointed to the front end bell so that between its magnetic core and the stator pack a cylindrical space is formed where said rotor set claw poles are situated with the possibility for free rotation together with said drive shaft, said rotor set with claw poles is built of supporting and supported elements jointed between themselves by a nonmagnetic ring, said supporting element consists of a supporting disk with a central hole with a step-like axial sector around realizing a permanent joint of said supporting element to said drive shaft, on the supporting disk periphery said claw poles are arranged uniformly, to said rear end bell a rear cover is attached, the identical second rotor and second excitation sets are placed mirror-image towards said rotor and excitation sets, wherein supporting elements of both rotor sets are jointed to said drive shaft, claw pole tips of supported elements of both rotor sets are jointed between themselves by an additional nonmagnetic ring to which also the claw poles of supporting elements of both rotor sets are jointed; said stator three-phase winding is composed of more than one three-phase winding, and at a number of slots per pole and phase q>1 the number of said three-phase windings is defined by the equation $$b=e+f$$

where e represents a number of first group three-phase windings and f represents a number of second group three-phase windings whereas said windings of said second group are transposed on 60/q electrical degrees toward said three-phase windings of said first group and each three-phase winding is connected by terminals and diodes to a rectified block; on the outside surface of said stator pack a second plurality of axial slots is formed which total a number that is less than the number z of the plurality of axial slots on its inner surface whereas projections between slots of said second plurality are situated over the slots of said first plurality; said rectified block is located on the outside wall of said rear end bell; the ratio of maximal width $t_{max}$ to minimal width $t_{min}$ of said claw poles is defined according to the condition $1,8 < t_{max}/t_{min} < 2$; wherein vent-holes in said front end bell are formed as a girdle and those on said rear end bell face surface are formed as an inner girdle and concentric thereof—outside girdle whereas the inner girdle of vent-holes is pervaded by an inner radiator; the outside diameter j of the sector of said cylindrical magnetic core outside surface with decreased diameter of each excitation set is over 50% greater than its inner diameter r of each excitation set.

2. The brushless alternator with claw pole rotor according to claim 1, wherein the number of windings in each of both groups is equal and each three-phase winding of both groups are arranged in all slots z when said number b of said three-phase windings is an even number.

3. The brushless alternator with claw pole rotor according to claim 2, wherein said rectified block consisting of group own to said three-phase winding isolated diodes and group own to said three-phase winding diodes connected to a chassis ground which are set correspondingly in inner and outside ring-shaped ribbed metal radiators, located concentric between themselves; each of said radiators and possesses plane contact surface by which is pressed to the rear wall of said rear end bell; said inner radiator has a cup-shaped bottom with a plurality of vent-holes and between the plane contact surface of said inner radiator and the rear wall of said rear end bell sheet of electric isolation is placed.

4. The brushless alternator with claw pole rotor according to claim 2, wherein through said outside girdle of vent-holes in said rear end bell said electrical leads for supplying a source of direct current electricity of field coils pass over as well as the leads of said three-phase windings.

5. The brushless alternator with claw pole rotor according to claim 2, wherein said projections between said slots of said second plurality of axial slots have a width s greater than a width w of said axial slots whereas the permanent joint between said housing and said stator is realized by projections made between every two adjacent outside axial slots on which said cylindrical housing is staved, provided on both peripheries with corresponding inner centering shoulder for said front and rear end bells.

6. The brushless alternator with claw pole rotor according to claim 2, wherein said three-phase windings which are located nearest to the openings of slots and are provided with terminals for additional alternative current consumers.

7. The brushless alternator with claw pole rotor according to claim 2, wherein the wire section of the situated one over other said windings in each said stator slot rises in the direction of the slot opening.

8. The brushless alternator with claw pole rotor according to claim 1, wherein there are at least part of said three-phase windings arranged in z/q stator slots whereupon those z/q slots are so selected that they are evenly distributed in said stator; if said number b of three-phase windings is divisible to the number of slots per pole and phase q, all three-phase windings are arranged in z/q slots; if said number b of said three-phase windings is not divisible to q, part nq three-phase windings where n is an integer, are arranged in z/q slots and the left part said three-phase windings with number less than q is arranged in all z slots.

9. The brushless alternator with claw pole rotor according to claim 8, wherein said rectified block consisting of group own to said three-phase winding isolated diodes and group own to said three-phase winding diodes connected to a chassis ground which are set correspondingly in inner and outside ring-shaped ribbed metal radiators, located concentric between themselves; each of said radiators and possesses plane contact surface by which is pressed to the rear wall of said rear end bell; said inner radiator has a cup-shaped bottom with a plurality of vent-holes and between the plane contact surface of said inner radiator and the rear wall of said rear end bell sheet of electric isolation is placed.

10. The brushless alternator with claw pole rotor according to claim 8, wherein through said outside girdle of vent-holes in said rear end bell said electrical leads for supplying a source of direct current electricity of field coils pass over as well as the leads of said three-phase windings.

11. The brushless alternator with claw pole rotor according to claim 8, wherein said projections between said slots of said second plurality of axial slots have a width s greater than a width w of said axial slots whereas the permanent joint between said housing and said stator is realized by projections made between every two adjacent outside axial slots on which said cylindrical housing is staved, provided on both peripheries with corresponding inner centering shoulder for said front and rear end bells.

12. The brushless alternator with claw pole rotor according to claim 8, wherein said three-phase windings which are located nearest to the openings of slots and are provided with terminals for additional alternative current consumers.

13. The brushless alternator with claw pole rotor according to claim 8, wherein the wire section of the situated one over other said windings in each said stator slot rises in the direction of the slot opening.

14. The brushless alternator with claw pole rotor according to claim 1, wherein said rectified block consisting of group own to said three-phase winding isolated diodes and group own to said three-phase winding diodes connected to a chassis ground which are set correspondingly in inner and outside ring-shaped ribbed metal radiators, located concentric between themselves; each of said radiators and possesses plane contact surface by which is pressed to the rear wall of said rear end bell; said inner radiator has a cup-shaped bottom with a plurality of vent-holes and between the plane contact surface of said inner radiator and the rear wall of said rear end bell sheet of electric isolation is placed.

15. The brushless alternator with claw pole rotor according to claim 14, wherein through said outside girdle of vent-holes in said rear end bell said electrical leads for supplying a source of direct current electricity of field coils pass over as well as the leads of said three-phase windings.

16. The brushless alternator with claw pole rotor according to claim 14, wherein said projections between said slots of said second plurality of axial slots have a width s greater than a width w of said axial slots whereas the permanent joint between said housing and said stator is realized by projections made between every two adjacent outside axial slots on which said cylindrical housing is staved, provided on both peripheries with corresponding inner centering shoulder for said front and rear end bells.

17. The brushless alternator with claw pole rotor according to claim 14, wherein said three-phase windings which are located nearest to the openings of slots and are provided with terminals for additional alternative current consumers.

18. The brushless alternator with claw pole rotor according to claim 1, wherein through said outside girdle of vent-holes in said rear end bell said electrical leads for supplying a source of direct current electricity of field coils pass over as well as the leads of said three-phase windings.

19. The brushless alternator with claw pole rotor according to claim 18, wherein said projections between said slots of said second plurality of axial slots have a width s greater than a width w of said axial slots whereas the permanent joint between said housing and said stator is realized by projections made between every two adjacent outside axial slots on which said cylindrical housing is staved, provided on both peripheries with corresponding inner centering shoulder for said front and rear end bells.

20. The brushless alternator with claw pole rotor according to claim 18, wherein said three-phase windings which are located nearest to the openings of slots and are provided with terminals for additional alternative current consumers.

21. The brushless alternator with claw pole rotor according to claim 1, wherein said projections between said slots of said second plurality of axial slots have a width s greater than a width w of axial slots whereas the permanent joint between said housing and said stator is realized by projections made between every two adjacent outside axial slots on which said cylindrical housing is staved, provided on both peripheries with corresponding inner centering shoulder for said front and rear end bells.

22. The brushless alternator with claw pole rotor according to claim 21, wherein said three-phase windings which are located nearest to the openings of slots and are provided with terminals for additional alternative current consumers.

23. The brushless alternator with claw pole rotor according to claim 1, wherein said three-phase windings which are located nearest to the openings of slots and are provided with terminals for additional alternative current consumers.

24. The brushless alternator with claw pole rotor according to claim 23, wherein the wire section of the situated one over other said windings in each said stator slot rises in the direction of the slot opening.

25. The brushless alternator with claw pole rotor according to claim 1, wherein the wire section of the situated one over other said windings in each said stator slot rises in the direction of the slot opening.

* * * * *